(12) United States Patent
Moasher et al.

(10) Patent No.: US 11,451,101 B2
(45) Date of Patent: Sep. 20, 2022

(54) ELECTRIC MOTOR ARRANGED FOR MOUNTING TO A COMBUSTION ENGINE

(71) Applicant: Schaeffler Technologies AG & Co. KG, Herzogenaurach (DE)

(72) Inventors: Mohammad Moasher, Fairlawn, OH (US); Maximilian Podschwadt, Ann Arbor, MI (US); David Burky, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/183,660

(22) Filed: Feb. 24, 2021

(65) Prior Publication Data

US 2022/0271587 A1 Aug. 25, 2022

(51) Int. Cl.
| | |
|---|---|
| *H02K 1/28* | (2006.01) |
| *F02B 63/04* | (2006.01) |
| *B60K 6/26* | (2007.10) |
| *B60K 6/24* | (2007.10) |
| *H02K 7/075* | (2006.01) |
| *H02K 11/225* | (2016.01) |
| *H02K 24/00* | (2006.01) |
| *H02K 7/00* | (2006.01) |
| *B60K 6/36* | (2007.10) |
| *B60K 6/28* | (2007.10) |

(52) U.S. Cl.
CPC ............... *H02K 1/28* (2013.01); *B60K 6/24* (2013.01); *B60K 6/26* (2013.01); *F02B 63/042* (2013.01); *H02K 7/006* (2013.01); *H02K 7/075* (2013.01); *H02K 11/225* (2016.01); *H02K 24/00* (2013.01); *B60K 6/28* (2013.01); *B60K 6/36* (2013.01)

(58) Field of Classification Search
CPC ... B60K 6/24; B60K 6/26; B60K 6/28; B60K 6/36; B60K 6/405; B60K 6/50; B60Y 2200/92; F02B 63/042; F16H 41/24; H02K 1/18; H02K 1/28; H02K 11/21; H02K 11/225; H02K 2213/12; H02K 24/00; H02K 5/1735; H02K 5/20; H02K 7/006; H02K 7/075; H02K 7/085; H02K 7/10; H02K 9/19
USPC ..................... 310/54, 68 B, 75 R, 112, 114
See application file for complete search history.

(56) References Cited

U.S. PATENT DOCUMENTS

| | | | | |
|---|---|---|---|---|
| 5,482,513 | A * | 1/1996 | Wilson | A61F 2/66 623/47 |
| 6,258,001 | B1 * | 7/2001 | Wakuta | B60K 6/48 903/952 |
| 2013/0193816 | A1 * | 8/2013 | Iwase | B60L 50/16 310/75 R |
| 2019/0315221 | A1 * | 10/2019 | Frait | B60K 6/48 |
| 2019/0351753 | A1 * | 11/2019 | Lehmann | F16D 25/10 |
| 2020/0384846 | A1 | 12/2020 | Ramsey et al. | |

\* cited by examiner

*Primary Examiner* — Rashad H Johnson

(57) ABSTRACT

An electric motor arranged for mounting to a combustion engine includes an axis of rotation, a hub, a first plate, a second plate, and a rotor. The first plate is fixed to the hub at a first radially inner diameter, the second plate is fixed to the first plate at a radially outer diameter and arranged for fixing directly to a crankshaft of the combustion engine at a second radially inner diameter, and the rotor is fixed to the hub at the first radially inner diameter. In an example embodiment, the first radially inner diameter is radially offset from the second radially inner diameter.

19 Claims, 2 Drawing Sheets

ELECTRIC MOTOR ARRANGED FOR MOUNTING TO A COMBUSTION ENGINE

TECHNICAL FIELD

The present disclosure relates generally to an electric motor, and more specifically to an electric motor arranged for mounting to a combustion engine.

BACKGROUND

Electric motors arranged for mounting to a combustion engine are known. One example is shown and described in commonly-assigned United States Patent Application Publication No. 2020/0384846 titled P1 HYBRID MODULE to Ramsey et al.

SUMMARY

Example embodiments broadly comprise an electric motor arranged for mounting to a combustion engine, including an axis of rotation, a hub, a first plate, a second plate, and a rotor. The first plate is fixed to the hub at a first radially inner diameter, the second plate is fixed to the first plate at a radially outer diameter and arranged for fixing directly to a crankshaft of the combustion engine at a second radially inner diameter, and the rotor is fixed to the hub at the first radially inner diameter. In an example embodiment, the first radially inner diameter is radially offset from the second radially inner diameter.

In some example embodiments, the electric motor includes a first fastener. The rotor includes a rotor carrier with an annular flange, the annular flange is disposed between the first plate and the hub, and the first fastener extends through respective holes in the annular flange and the first plate to fix the annular flange and the first plate to the hub. In some example embodiments, the hub includes a cylindrical protrusion and the annular flange includes a first bore arranged on the cylindrical protrusion to radially position the rotor carrier relative to the hub. In an example embodiment, the first plate includes a second bore arranged on the cylindrical protrusion to radially position the first plate relative to the hub.

In an example embodiment, a one of the first plate or the second plate includes a cutout section, and the other of the first plate or the second plate includes an axially offset portion extending into the cutout section such that the axially offset portion and a portion of the one of the first plate or the second plate overlap in a circumferential direction.

In some example embodiments, the electric motor includes a stud and a nut. The stud is fixed to a one of the first plate or the second plate at the radially outer diameter, the stud extends through a hole in the other of the first plate or the second plate, and the nut is threaded onto the stud to fix the second plate to the first plate. In an example embodiment, the electric motor includes a housing arranged for bolting to an engine block of the combustion engine. The housing includes an access hole disposed at the radially outer diameter for inserting a tool to tighten the nut on the stud.

In some example embodiments, the electric motor includes a housing arranged for bolting to an engine block of the combustion engine and a stator, fixed in the housing radially outside of the rotor. In some example embodiment, the electric motor includes a bearing for radially positioning the hub in the housing. In some example embodiments, the housing includes a bulkhead wall with an axially extending protrusion and the bearing is disposed radially between the hub and the axially extending protrusion. In an example embodiment, the hub, the bearing, the housing, the rotor and the stator all overlap at least partially when viewed in a radial direction. In an example embodiment, the electric motor includes a resolver stator fixed to the housing and a resolver rotor fixed to the hub. The resolver stator and the resolver rotor are arranged to determine a rotational position of the electric motor.

Other example aspects broadly comprise a method of mounting an electric motor to a combustion engine including providing the electric motor. The electric motor includes an axis of rotation, a first plate, a hub with a threaded hole, a second plate, a rotor including a rotor carrier with an annular flange, and a first fastener. The method also includes fixing the first plate and the annular flange to the hub by inserting the first fastener through respective holes in the first plate and the annular flange, and threading the first fastener into the threaded hole at a first radially inner diameter. The method also includes fixing the second plate to a crankshaft of the combustion engine with a second fastener at a second radially inner diameter and fixing the first plate to the second plate at a radially outer diameter.

In some example embodiments, the electric motor includes a stud and a nut. The stud is fixed to a one of the first plate or the second plate at the radially outer diameter and extends through a hole in the other of the first plate or the second plate, and the method includes threading the nut onto the stud to fix the first plate to second plate. In an example embodiment, the electric motor includes a housing with an access hole arranged for receiving a tool, and the method includes fixing the housing to an engine block of the combustion engine and inserting the tool through the access hole and tightening the nut on the stud after the step of fixing the housing to the engine block.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
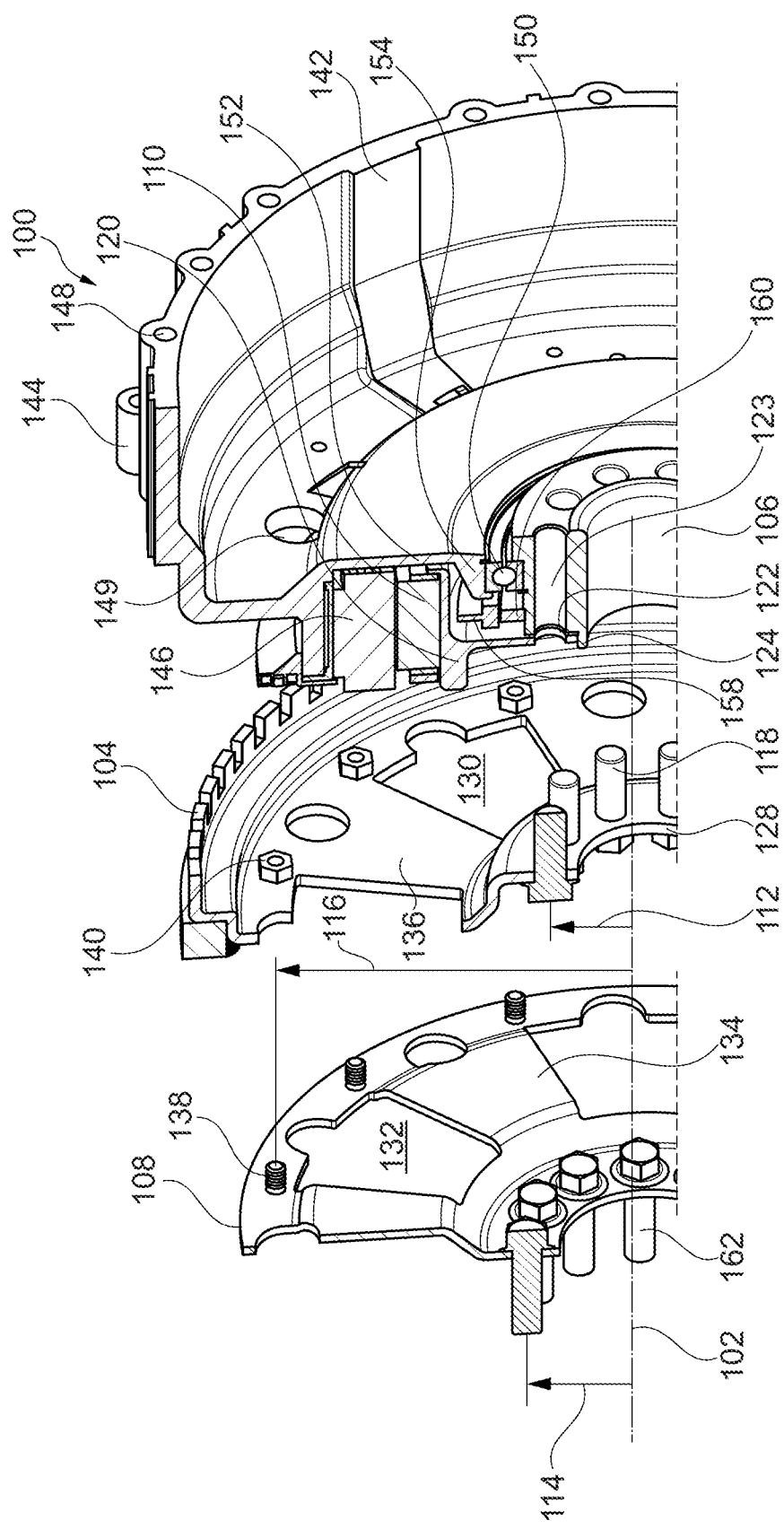
FIG. 1 illustrates an exploded perspective section view of an electric motor according to an example aspect of the present disclosure.
Figure 2:
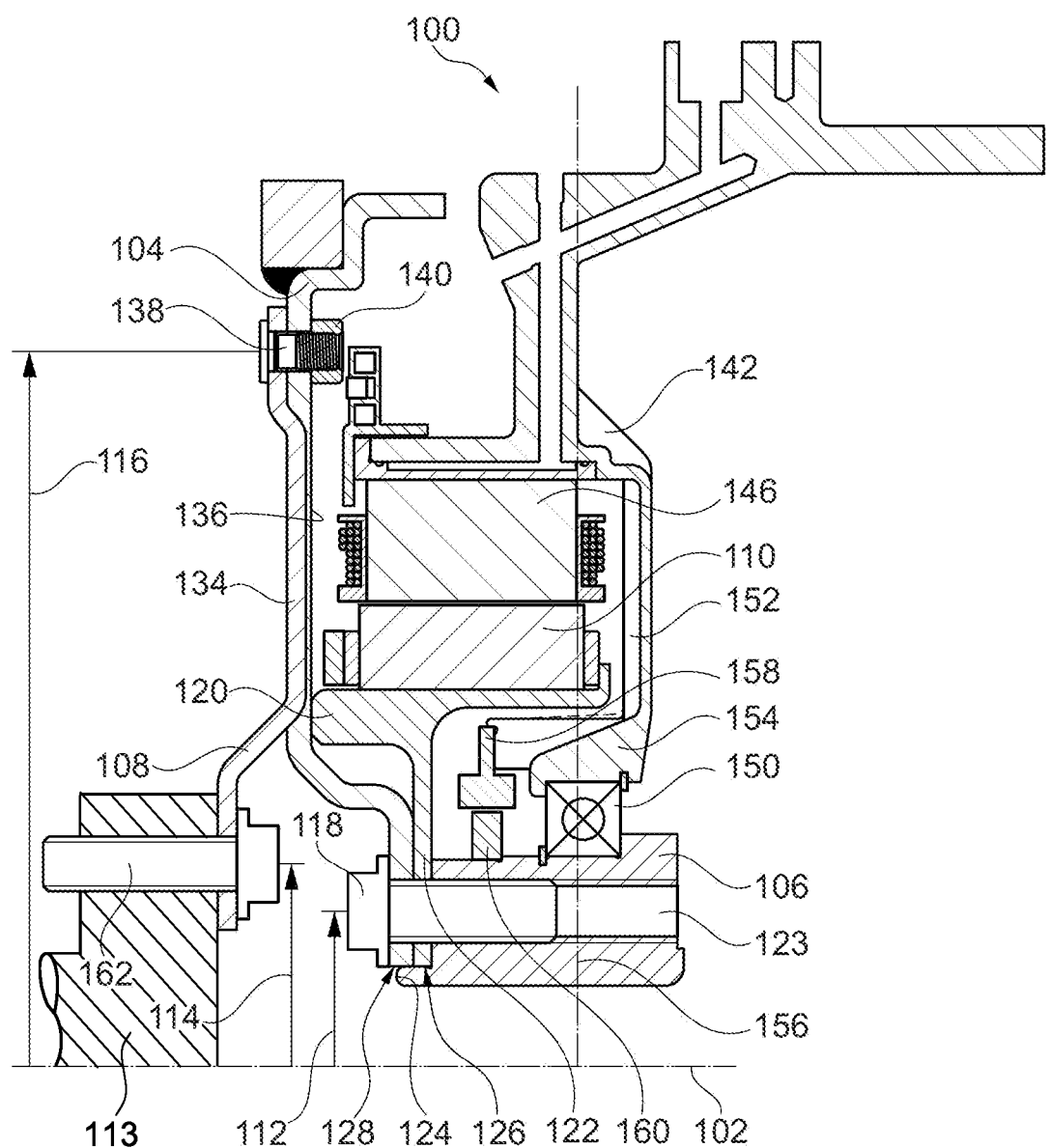
FIG. 2 illustrates a section view of the electric motor of FIG. 1.

The following description is made with reference to FIGS. 1-2. FIG. 1 illustrates an exploded perspective section view of electric motor 100. FIG. 2 illustrates a section view of electric motor 100 of FIG. 1. Electric motor 100 is arranged for mounting to a combustion engine (not shown) as described below. Electric motor 100 includes axis of rotation 102, plate 104, hub 106, plate 108 and rotor 110. Plate 104 is fixed to the hub at radially inner diameter 112. Plate 108 is arranged for fixing directly to crankshaft 113 of the combustion engine at radially inner diameter 114, and fixed to plate 104 at radially outer diameter 116. Rotor 110 is fixed to the hub as described below.

As can be seen in FIG. 2, radially inner diameter 112 is radially offset from radially inner diameter 114. Although diameter 112 is shown radially inside of diameter 114, other embodiments (not shown) may include diameter 112 radially outside of diameter 114. Electric motor 100 includes fastener 118 and rotor 110 includes rotor carrier 120 with annular flange 122. Flange 122 is disposed between plate 104 and hub 106, and fastener 118 extends through respective holes in the annular flange and plate 104 into threaded holes 123 to fix the annular flange and plate 104 to the hub. In the embodiment shown, fastener 118 is a bolt though other embodiments (not shown) may use other fasteners (e.g., a stud extending from the hub and secured by a nut).

Hub 106 includes cylindrical protrusion 124 and the annular flange includes bore 126 arranged on the cylindrical protrusion to radially position the rotor carrier relative to the hub. Similarly, plate 104 includes bore 128 arranged on the cylindrical protrusion to radially position the plate relative to the hub. Although bores 126 and 128 are shown with a same diameter, other embodiments (not shown) may include a radial step in the cylindrical protrusion and bores with different diameters.

As best shown in FIG. 1, plate 104 includes cutouts 130 and plate 108 includes cutouts 132. Plate 108 also includes axially offset portion 134 circumferentially between a pair of cutouts 132. Portion 134 extends into cutout section 130 such that the axially offset portion and portion 136 of plate 104 overlap in a circumferential direction. In other words, a circumferential line drawn about the axis would pass through the axially offset portion and the portion. Otherwise stated, at least a portion of the axially offset portion and a portion of portion 136 of plate 104 are positioned at a same axial position. Although the axially extending portion is shown in plate 108, other embodiments (not shown) may include the axially extending portion in plate 104 extending into cutout 132 in plate 108.

Motor 100 also includes stud 138 and nut 140. Stud 138 is fixed to plate 108 at radially outer diameter 114 and extends through a hole in plate 104. Nut 140 is threaded onto the stud to fix the second plate to the first plate. That is, the stud is pressed into a hole in plate 108 and held secure so that the nut can be installed and tightened to fix the two plates together. It should be noted that other embodiments (not shown) may include the stud installed in plate 104 and passing through a hole in plate 108 and/or a removable bolt used in place of stud 138.

Electric motor 100 includes housing 142 arranged for bolting (at boss 144, for example) to an engine block (not shown) of the combustion engine, and stator 146 fixed in the housing radially outside of the rotor. Housing 142 is also arranged for bolting to a transmission at holes 148, for example. That is, motor 100 can be installed between a combustion engine and transmission to provide an electric boost to a driveline and/or generate electricity from the driveline. When installed in a vehicle driveline, example uses for the motor could be providing a power boost when the vehicle is launched from a stop or when climbing a hill, regenerating a battery when the vehicle is descending a hill or slowing down, or using the combustion engine to generate electricity for a battery or another externally connected electrical device.

Housing 142 includes access hole 149 disposed at the radially outer diameter for inserting a tool to tighten the nut on the stud. That is, after fixing to the engine block but before installing a transmission, a tool may be inserted through hole 149 to tighten the nut on the stud, securing plates 104 and 108 together.

Motor 100 includes bearing 150 for radially positioning the hub in the housing. Housing 142 includes bulkhead wall 152 with axially extending protrusion 154 and bearing 150 is disposed radially between the hub and the axially extending protrusion. Therefore, because the hub and the stator are both positioned by the housing, and the rotor is secured to the hub by the rotor carrier and positioned by the cylindrical protrusion, an air gap between the rotor and the stator is better controlled. As can be seen in FIG. 2, for example, the hub, the bearing, the housing, the rotor and the stator all overlap at least partially when viewed in a radial direction. In other words, radially extending line 156 passes through all of the components.

Electric motor 100 also includes resolver stator 158 fixed to the housing and resolver rotor 160 fixed to the hub. The resolver stator and the resolver rotor are arranged to determine a rotational position of the rotor. That is, because the resolver rotor rotates with the motor rotor, a position of the motor rotor relative to the motor stator can be transmitted to a control module for energizing and de-energizing electrical coils of the motor stator for rotating the motor rotor or generating electricity.

The present disclosure also includes a method of mounting an electric motor to a combustion engine. The method includes providing electric motor 100 with axis of rotation 102, plate 104, hub 106 with threaded hole 123, plate 108, rotor 110 including rotor carrier 120 with annular flange 122, and fastener 118. The method also includes fixing plate 104 and annular flange 122 to the hub by inserting fastener 118 through respective holes in the plate and the annular flange, and threading the fastener into the threaded hole at radially inner diameter 112. The method also includes fixing the plate 108 to crankshaft 113 of the combustion engine with fastener 162 at radially inner diameter 114, and fixing plate 104 to plate 108 at radially outer diameter 116.

The electric motor includes stud 138 fixed to plate 108 at radially outer diameter 116. The stud extends through a hole in plate 104 and the method further includes threading the nut onto the stud to fix the plate 104 to plate 108. The motor includes housing 142 with access hole 149 arranged for receiving a tool. The method includes fixing the housing to an engine block of the combustion engine, inserting the tool through the access hole, and tightening the nut on the stud after the step of fixing the housing to the engine block.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Electric motor
102 Axis of rotation
104 Plate (first)
106 Hub
108 Plate (second)
110 Rotor
112 Radially inner diameter (first)
11 3 Crankshaft
114 Radially inner diameter (second)
116 Radially outer diameter
118 Fastener (first)
120 Rotor carrier
122 Annular flange
123 Threaded holes (hub)
124 Cylindrical protrusion (hub)
126 Bore (first, annular flange)
128 Bore (second, second plate)
130 Cutout (first plate)
132 Cutout (second plate)
134 Axially offset portion (second plate)
136 Portion (first plate)
138 Stud
140 Nut
142 Housing
144 Boss (housing)
146 Stator
148 Holes (housing)
149 Access hole (housing)
150 Bearing
152 Bulkhead wall
154 Axially extending protrusion
156 Radially extending line
158 Resolver stator
160 Fastener (second)

What is claimed is:

1. An electric motor arranged for mounting to a combustion engine, comprising:
    an axis of rotation;
    a hub;
    a first plate, fixed to the hub at a first radially inner diameter; and
    a second plate, fixed to the first plate at a radially outer diameter and arranged for fixing directly to a crankshaft of the combustion engine at a second radially inner diameter; and
    a rotor, fixed to the hub at the first radially inner diameter; and
    a first fastener, wherein:
        the rotor comprises a rotor carrier with an annular flange;
        the annular flange is disposed between the first plate and the hub; and
        the first fastener extends through respective holes in the annular flange and the first plate to fix the annular flange and the first plate to the hub.

2. The electric motor of claim 1 wherein the first radially inner diameter is radially offset from the second radially inner diameter.

3. The electric motor of claim 1 wherein:
    the hub comprises a cylindrical protrusion; and
    the annular flange comprises a first bore arranged on the cylindrical protrusion to radially position the rotor carrier relative to the hub.

4. The electric motor of claim 3 wherein the first plate comprises a second bore arranged on the cylindrical protrusion to radially position the first plate relative to the hub.

5. The electric motor of claim 1, wherein
    a one of the first plate or the second plate comprises a cutout section; and
    the other of the first plate or the second plate comprises an axially offset portion extending into the cutout section such that the axially offset portion and a portion of the one of the first plate or the second plate overlap in a circumferential direction.

6. The electric motor of claim 1 further comprising:
    a stud; and
    a nut, wherein:
        the stud is fixed to one of the first plate or the second plate at the radially outer diameter;
        the stud extends through a hole in the other of the first plate or the second plate; and
        the nut is threaded onto the stud to fix the second plate to the first plate.

7. The electric motor of claim 6 further comprising a housing arranged for bolting to an engine block of the combustion engine, wherein the housing comprises an access hole disposed at the radially outer diameter for inserting a tool to tighten the nut on the stud.

8. The electric motor of claim 1 further comprising:
    a housing arranged for bolting to an engine block of the combustion engine; and
    a stator, fixed in the housing radially outside of the rotor.

9. The electric motor of claim 8 further comprising a bearing for radially positioning the hub in the housing.

10. The electric motor of claim 9 wherein:
    the housing comprises a bulkhead wall with an axially extending protrusion; and
    the bearing is disposed radially between the hub and the axially extending protrusion.

11. The electric motor of claim 10 wherein the hub, the bearing, the housing, the rotor and the stator all overlap at least partially when viewed in a radial direction.

12. The electric motor of claim 8 further comprising:
    a resolver stator fixed to the housing; and
    a resolver rotor fixed to the hub, wherein the resolver stator and the resolver rotor are arranged to determine a rotational position of the rotor.

13. A method of mounting an electric motor to a combustion engine comprising:
providing the electric motor, the electric motor comprising:
an axis of rotation;
a first plate;
a hub with a threaded hole;
a second plate;
a rotor including a rotor carrier with an annular flange; and
a first fastener;
fixing the first plate and the annular flange to the hub by inserting the first fastener through respective holes in the first plate and the annular flange, and threading the first fastener into the threaded hole at a first radially inner diameter; and
fixing the second plate to a crankshaft of the combustion engine with a second fastener at a second radially inner diameter;
fixing the first plate to the second plate at a radially outer diameter.

14. The method of claim 13, wherein:
the electric motor further comprises a stud and a nut;
the stud is fixed to a one of the first plate or the second plate at the radially outer diameter;
the stud extends through a hole in the other of the first plate or the second plate; and
the method further includes threading the nut onto the stud to fix the first plate to second plate.

15. The method of claim 14, wherein:
the electric motor further comprises a housing with an access hole arranged for receiving a tool; and
the method includes:
fixing the housing to an engine block of the combustion engine; and
inserting the tool through the access hole and tightening the nut on the stud after the housing is fixed to the engine block.

16. An electric motor arranged for mounting to a combustion engine, comprising:
an axis of rotation;
a hub;
a first plate, fixed to the hub at a first radially inner diameter; and
a second plate, fixed to the first plate at a radially outer diameter and arranged for fixing directly to a crankshaft of the combustion engine at a second radially inner diameter; and
a rotor, fixed to the hub at the first radially inner diameter, wherein
a one of the first plate or the second plate comprises a cutout section; and
the other of the first plate or the second plate comprises an axially offset portion extending into the cutout section such that the axially offset portion and a portion of the one of the first plate or the second plate overlap in a circumferential direction.

17. The electric motor of claim 16 wherein the first radially inner diameter is radially offset from the second radially inner diameter.

18. The electric motor of claim 16 further comprising:
a housing arranged for bolting to an engine block of the combustion engine; and
a stator, fixed in the housing radially outside of the rotor.

19. The electric motor of claim 18 further comprising a bearing for radially positioning the hub in the housing.

* * * * *